United States Patent
Homma et al.

(10) Patent No.: US 10,857,850 B2
(45) Date of Patent: Dec. 8, 2020

(54) STABILIZER BUSHING

(71) Applicants: TOYOTA JIDOSHA KABUSHIKI KAISHA, Toyota (JP); Sumitomo Riko Company Limited, Komaki (JP)

(72) Inventors: Yuji Homma, Nagoya (JP); Taisuke Nishimura, Toukai (JP); Masami Endo, Komaki (JP); Norimasa Kuki, Komaki (JP); Daiki Mimpo, Komaki (JP); Ryusuke Yamada, Komaki (JP)

(73) Assignees: TOYOTA JIDOSHA KABUSHIKI KAISHA, Aichi-ken (JP); Sumitomo Riko Company Limited, Aichi-ken (JP)

( * ) Notice: Subject to any disclaimer, the term of this patent is extended or adjusted under 35 U.S.C. 154(b) by 61 days.

(21) Appl. No.: 16/180,186

(22) Filed: Nov. 5, 2018

(65) Prior Publication Data
US 2019/0135069 A1    May 9, 2019

(30) Foreign Application Priority Data
Nov. 6, 2017   (JP) ................................. 2017-213693

(51) Int. Cl.
*B60G 21/055*    (2006.01)
*B29C 65/00*    (2006.01)
(Continued)

(52) U.S. Cl.
CPC .... *B60G 21/0551* (2013.01); *B29C 66/53241* (2013.01); *B29L 2031/721* (2013.01);
(Continued)

(58) Field of Classification Search
CPC ............ B60G 21/0551; B60G 2206/91; B60G 2204/1222; B60G 2206/73;
(Continued)

(56) References Cited

U.S. PATENT DOCUMENTS

| | | | |
|---|---|---|---|
| 6,893,034 B2 * | 5/2005 | Fader ................. | B60G 21/0551 280/124.166 |
| 2006/0091595 A1 * | 5/2006 | Hayashi ............. | B60G 21/0551 267/276 |

(Continued)

FOREIGN PATENT DOCUMENTS

| | | | | |
|---|---|---|---|---|
| JP | 2007-127239 A | | 5/2007 | |
| WO | WO-2011102373 A1 * | | 8/2011 | ......... B60G 21/0551 |

OTHER PUBLICATIONS

Machine Translation of WO2011102373 (Year: 2011).*

*Primary Examiner* — Paul N Dickson
*Assistant Examiner* — Kurtis Nielson
(74) *Attorney, Agent, or Firm* — Sughrue Mion, PLLC

(57) ABSTRACT

A stabilizer bushing installed on a stabilizer bar is made of two divided parts of rubber or the like to prevent or decrease generation of a gap in a bonding surface. The stabilizer bushing installed on an outer periphery of the stabilizer bar by adhesion includes divided rubber bushings of an upper rubber bushing and a lower rubber bushing. Before adhesion, both end portions of the upper and lower rubber bushings, respectively, in a circumferential direction are tapered so that an overlapping amount between the upper and lower rubber bushings increases toward the outer periphery side of the bushings. After adhesion, a bonding surface is bonded by pressure.

3 Claims, 5 Drawing Sheets

(51) Int. Cl.
*F16F 1/16* (2006.01)
*F16F 1/38* (2006.01)
*B29L 31/00* (2006.01)

(52) U.S. Cl.
CPC .. *B60G 2204/1222* (2013.01); *B60G 2204/41* (2013.01); *B60G 2206/73* (2013.01); *B60G 2206/821* (2013.01); *B60G 2206/91* (2013.01); *F16F 1/16* (2013.01); *F16F 1/3856* (2013.01); *F16F 2226/042* (2013.01); *F16F 2228/08* (2013.01)

(58) Field of Classification Search
CPC .......... B60G 2204/41; B60G 2206/821; B29C 66/53241; F16F 2226/042; F16F 1/16; F16F 1/3856; B29L 2031/721
USPC .................................................. 280/124.106
See application file for complete search history.

(56) References Cited

U.S. PATENT DOCUMENTS

| | | | |
|---|---|---|---|
| 2006/0125165 A1* | 6/2006 | Niwa | B60G 21/0551 267/293 |
| 2012/0024463 A1* | 2/2012 | Grundmeier | B29C 66/532 156/91 |
| 2017/0008365 A1* | 1/2017 | Tsukamoto | B60G 21/0551 |

* cited by examiner

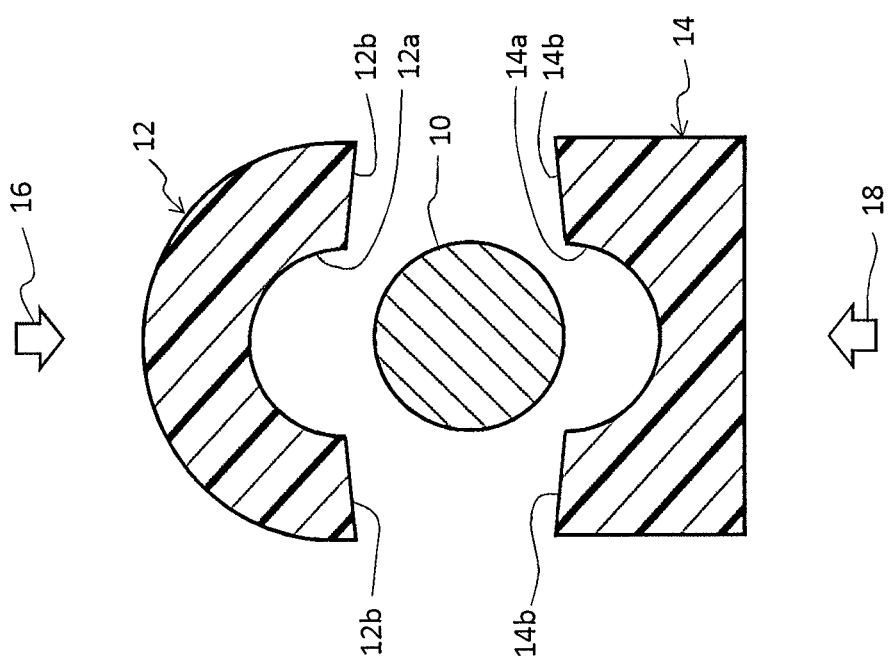

STABILIZER BUSHING

CROSS REFERENCE TO RELATED APPLICATION

The disclosure of Japanese Patent Application No. 2017-213693 filed on Nov. 6, 2017 including the specification, claims, drawings, and abstract is incorporated herein by reference in its entirety.

TECHNICAL FIELD

The present disclosure relates to a stabilizer bushing attached to a stabilizer bar of a vehicle.

BACKGROUND

A stabilizer bar is disposed across left and right suspensions of a vehicle to prevent tilting of the vehicle body during turning or the like to thereby improve stability of travelling of the vehicle. The stabilizer bar often comes with stabilizer bushings attached in the middle part of the stabilizer bar to enable the stabilizer bar to be supported in an antivibration manner.

Patent Document 1 discloses a stabilizer bushing made of rubber, in which rubber is divided into two parts and these parts are combined to form the stabilizer bushing.

CITATION LIST

PATENT DOCUMENT 1: JP 2007-127239 A

SUMMARY

Technical Problem

In forming the stabilizer bushing with two divided parts of rubber or the like, a gap would be formed in a bonding surface, and foreign objects, such as sand, dirt, water, or the like, may enter the gap. It is also likely that the entered foreign object might generate wearing sound, stick-slip sound, or the like.

Solution to Problem

It is an object of the present disclosure to prevent or decrease generation of a gap in a bonding surface during forming a stabilizer bushing with two divided parts of rubber or the like.

A stabilizer bushing according to an aspect of the present disclosure is formed of an elastic member, includes two divided bushings attached to an outer periphery of a stabilizer bar by adhesion, and both end portions of the divided bushings in a circumferential direction are formed so that an overlapping amount between the divided bushings increases toward the outer periphery side before adhesion.

In the one aspect of the present disclosure, the divided bushings face each other across the stabilizer bar after the adhesion, and the end portions, which face each other, in the circumferential direction are bonded by pressure after the adhesion.

In the one aspect of the present disclosure, the both end portions of the divided bushings in the circumferential direction are tapered to protrude toward each other in a manner that a protruding amount increases toward the outer periphery side of the divided bushings.

Advantageous Effects of Invention

In the present disclosure, the end portions of the divided bushings in the circumferential direction are formed so that the overlapping amount between the divided bushings increases toward the outer periphery side, thus preventing or decreasing generation of a gap in the bonding surface.

BRIEF DESCRIPTION OF DRAWINGS

An embodiment of the present disclosure will be described by reference to the following drawings, wherein:

FIG. 1A is a cross-sectional view of a stabilizer bushing according to an embodiment before adhesion;

DESCRIPTION OF EMBODIMENT

An embodiment of the present disclosure will be described below with reference to the accompanying drawings. Although the description of the embodiment is given to facilitate understanding of the present disclosure, the embodiment is presented by way of example only and the invention may be embodied in a variety of other forms.

Figure 1B:
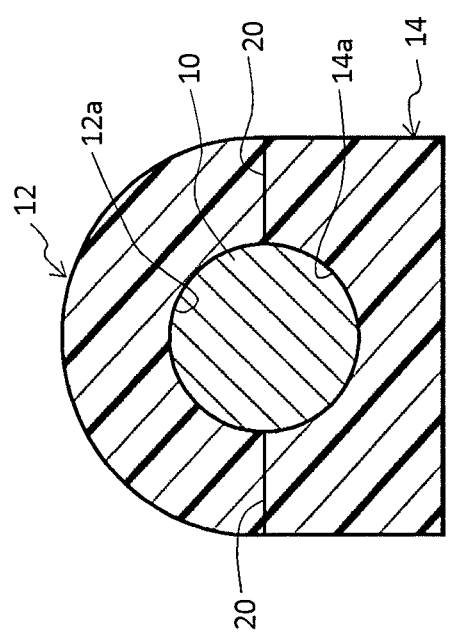
FIG. 1B is a cross-sectional view of the stabilizer bushing according to the embodiment after adhesion.

FIGS. 1A and 1B are cross-sectional views for describing a stabilizer bushing according to an embodiment. FIG. 1A shows a state before an upper rubber bushing 12 and a lower rubber bushing 14 are adhered to a stabilizer bar 10, and FIG. 1B shows a state after adhesion.

The stabilizer bar 10 is a part for controlling tilting of the vehicle. For example, a four-wheel vehicle typically includes suspensions near wheels for supporting the body of the vehicle. In many vehicles, the stabilizer bar 10 is provided on the front side to connect suspensions of left and right front wheels, while the stabilizer bar 10 is provided on the rear side to connect suspensions of left and right rear wheels. When the left and right suspensions shrink differently, the stabilizer bar 10 acts to eliminate the difference to thereby improve stability of travelling of the vehicle. The stabilizer bar 10 is typically formed by processing a piece of column-shaped member into a predetermined shape, such as a U-shape, to increase the travelling stability of the vehicle. Alternatively, the left and right stabilizer bars 10 may be made of different bar-shaped materials.

The upper and lower rubber bushings 12 and 14 are installed on the stabilizer bar 10. Both the upper and lower rubber bushings 12 and 14 are made of natural rubber by molding. Other elastic materials, such as synthetic rubber, may be used instead of natural rubber.

As shown in FIG. 1A, the upper rubber bushing 12 is attached to an upper outer periphery of the stabilizer bar 10 and is formed in a half cylindrical shape having an approximately half circular cross-section. A thickness of the upper rubber bushing 12 in a radial direction (distance between the inner periphery and the outer periphery) can be set in various manners. An inner periphery of the upper rubber bushing 12 is formed in a shape substantially matching the shape of the outer periphery of the stabilizer bar 10. Both end portions 12b of the upper rubber bushing 12 in a circumferential direction are linearly tapered to protrude toward the lower rubber bushing 14 side so that the thickness of the end portions 12*b* gradually increases toward the outer periphery (outer diameter side). Specifically, the inner periphery 12*a* of the upper rubber bushing 12 expands in a straight manner for about 180 degrees in the circumferential direction between about −90 degrees and 90 degrees, while the outer periphery expands in a reflex manner for about 190 degrees between about −95 degrees and about 95 degrees. Thus, the outermost side of the periphery of the both end portions 12*b* protrudes about 1 mm to 3 mm, for example, toward the outer periphery side compared to the innermost side of the periphery, although the protrusion depends on the thickness of the upper rubber bushing 12 in the radial direction.

The lower rubber bushing 14 is attached to the lower outer periphery of the stabilizer bar 10 and is formed in a half cylindrical shape. Like the inner periphery 12*a* of the upper rubber bushing 12, an inner periphery 14*a* of the lower rubber bushing 14 is also formed in a half-cylindrical shape to match the outer periphery of the stabilizer bar 10. An outer periphery of the lower rubber bushing 14 is formed in a half prism shape having two nearly right-angle corners. Both end portions 14*b* of the lower rubber bushing 14 in the circumferential direction have a thickness in the radial direction substantially equal to the thickness of the end portions 12*b* of the upper rubber bushing 12 in the circumferential direction. Like the end portions 12*b* of the upper rubber bushing 12, the end portions 14*b* of the lower rubber bushing 14 are linearly tapered to protrude toward the upper rubber bushing side so that the thickness of the end portions 14*b* gradually increases toward the outer periphery. Specifically, the inner periphery 14*a* expands in a straight manner for about 180 degrees in the circumferential direction between about −90 degrees and 90 degrees, while the outer periphery expands in a reflex manner for about 190 degrees between about −95 degrees and about 95 degrees. Thus, the lower rubber bushing 14 protrudes about 1 mm to 3 mm, for example, on the outer periphery side, similar to the outer periphery of the lower rubber busing 12. As a result, both end portions 12*b* of the upper rubber bushing 12 and both end portions 14*b* of the lower rubber bushing 14 are formed to overlap, each by an angle of about 10 degrees, or a protruding amount toward the outer periphery side of about 2 mm to 6 mm.

An adhesive is applied to the inner peripheries 12*a* and 14*a* of the upper and lower rubber bushings 12 and 14, respectively. No adhesive is applied to the both end portions 12*b* and 14*b* of the upper and lower rubber bushings 12 and 14, respectively. The adhesive needs to have a stable adhesive characteristic, and epoxy or silicon resin adhesives, for example, can be used.

Once the adhesive is applied, the upper rubber bushing 12 is pressed in a direction of an arrow 16, while the lower rubber busing 14 is pressed in a direction of an arrow 18, toward the stabilizer bar 10. The pressing is carried out with a jig that surrounds externally the upper and lower rubber bushings 12 and 14 to press them in the directions of the arrows 16 and 18. The jig presses the inner periphery 12*a* of the upper rubber bushing 12 toward an upper outer periphery of the stabilizer bar 10, while pressing the inner periphery 14*a* of the lower rubber bushing 14 toward a lower outer periphery of the stabilizer bar 10. Meanwhile, both end portions 12*b* of the upper rubber bushing 12 and both end portions 14*b* of the lower rubber bushing 14 also press each other toward the opposite ends. The pressing is carried out until the inner peripheries 12*a* and 14*a* contact the stabilizer bar 10 sufficiently. Various pressing levels can be used. In one example, the upper and lower rubber bushings 12 and 14 are pressed and crushed for about 2 to 4 mm in total after both the inner peripheries 12*a* and 14*a* come into contact with each other. The jig is removed after the adhesive is solidified.

FIG. 1B is a cross-sectional view after the upper and lower rubber bushings 12 and 14 are adhered to the stabilizer bar 10. The inner periphery 12*a* of the upper rubber bushing 12 is adhered to the entire surface of the upper outer periphery of the stabilizer bar 10, while the inner periphery 14*a* of the lower rubber bushing 14 is adhered to the entire surface of the lower outer periphery of the stabilizer bar 10. Both end portions 12*b* of the upper rubber bushing 12 and both end portions 14*b* of the lower rubber bushing 14 are deformed by pressing and come in close contact with an entire bonding surface 20 that extends nearly horizontally. Specifically, those end portions 12*b* and 14*b* are in close contact with each other by pressing from the innermost periphery side (innermost diameter side) to the outermost periphery side (outermost diameter side) of the upper and lower rubber bushings 12 and 14 that contact the stabilizer bar 10. Although the innermost periphery sides of the both end portions 12*b* and 14*b* are formed not overlapping each other in the circumferential direction, they are left pressed after the adhesion, because the adhesion is carried out while being pressed. Other portions of both end portions 12*b* and 14*b* are pressed and in close contact with each other after the adhesion, as both end portions 12*b* and 14*b* are tapered to overlap each other in the circumferential direction and the adhesion is carried out during pressing.

Figure 2:
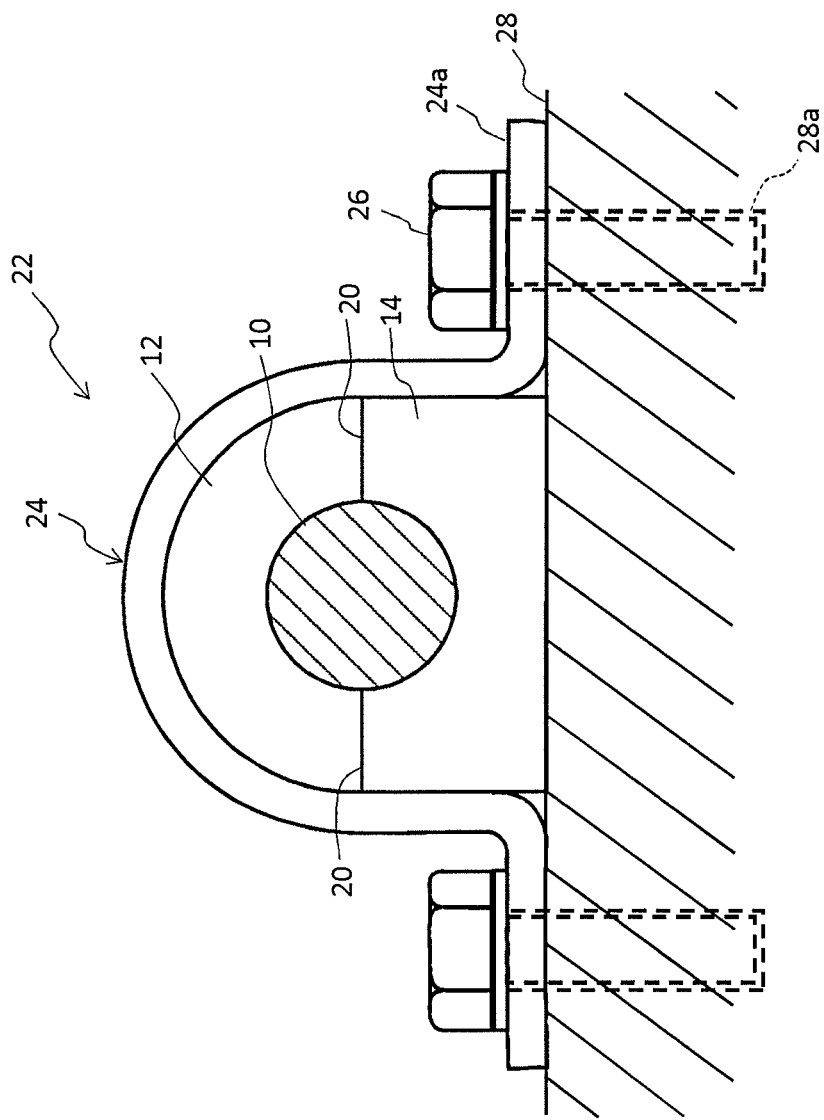
FIG. 2 is a side view of the stabilizer busing when installed on a vehicle body.

FIG. 2 is a side view for explaining installation of a stabilizer bushing 22 on the vehicle body. In addition to the upper and lower rubber bushings 12 and 14, the stabilizer bushing 22 includes a metal casing 24 and bolts 26 as fasteners used to install the stabilizer bushing 22 on the vehicle body. The casing 24 is made by bending a metal plate. Connecting portions 24*a* each having a bolt hole are provided on respective sides of the casing 24. A large concave space is formed on the center side of the casing 24 to cover the outer peripheries of the upper and lower rubber bushings 12 and 14.

To install the stabilizer bushing 22 on a vehicle body 28, the lower rubber bushing 14 is placed so that its bottom surface is in contact with a predetermined position of the vehicle body 28, and the casing 24 is put on to cover the upper rubber bushing 12 side. The casing 24 is then fastened with the bolts 26 to bolt holes 28*a* of the vehicle body 28 to complete the installation. Fixed to slightly press the upper and lower rubber bushings 12 and 14, the casing 24 is tightly attached to the outer periphery side of the upper rubber bushing 12. Further, the bottom surface of the lower rubber bushing 14 is also tightly attached to the vehicle body 28.

Next, the operation of the stabilizer bushing 22 is described. The stabilizer bar 10 mainly moves vertically in response to the lateral tilting of the vehicle body, while sometimes rotating axially in a somewhat twisting manner. At this time, the inner peripheries 12*a* and 14*a* of the upper and lower rubber bushings 12 and 14, respectively, that are adhered to the stabilizer bar 10 also move integrally with the stabilizer bar 10. As a result, the upper and lower rubber bushings 12 and 14 accumulate their movement partly as elastic deformation, while trying to follow the stabilizer bar 10 as a whole and applying force to the vehicle body 28 directly or indirectly through the casing 24. Thus, the stabilizer bar 10 carries out posture control. In this step, the stabilizer bushing 22 receives reaction force from the vehicle body 28, and the reaction force partially acts on the stabilizer bar 10.

During the travel of the vehicle, the stabilizer bushing 22 collects sand, dirt, water, or the like. Therefore, if there is a gap in the bonding surface 20 between the upper and lower rubber bushings 12 and 14, the sand, dirt, water, or the like may enter the gap to generate scratching sound or stick-slip sound. However, the stabilizer bushing 22 of the present disclosure has no gap in the bonding surface 20, as the upper and lower rubber bushings 12 and 14 are tightly pressed and bonded by elasticity of rubber. This prevents intrusion of sand, dirt, water, or the like, and no abnormal sound is generated.

After long-term use, the upper and lower rubber bushings 12 and 14 of the stabilizer bushing 22 may be degraded and their elasticity may decrease. This may lead to the generation of the gap that has not been present initially in the bonding surface 20 between the upper and lower rubber bushings 12 and 14. However, the stabilizer bushing 22 is designed to adjust the tapering degree or the like of the both end portions 12b and 14b to prevent generation of the gap in the bonding surface 20 between the upper and lower rubber bushings 12 and 14. This decreases the intrusion of sand, dirt, water, or the like in the gap, although some degradation may occur, and also prevents the generation of abnormal sound.

Figure 3A:
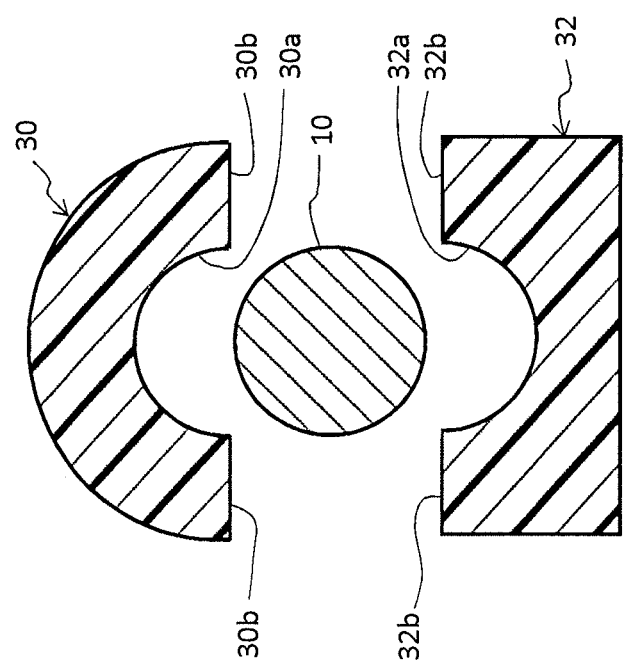
FIG. 3A is a cross-sectional view of a stabilizer bushing according to a comparison example before adhesion.
Figure 3B:
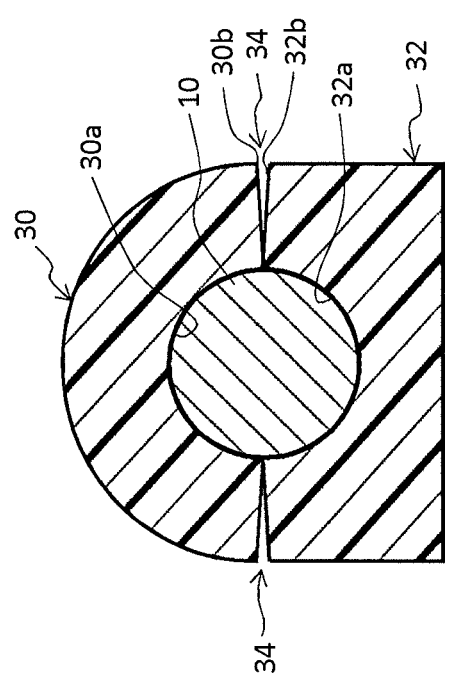
FIG. 3B is a cross-sectional view of the comparison example after adhesion.

Next, a comparison example is described with reference to FIGS. 3A and 3B. FIGS. 3A and 3B are cross-sectional views corresponding to FIGS. 1A and 1B, respectively. FIG. 3A shows a state before an upper rubber bushing 30 and a lower rubber bushing 32 are adhered to the stabilizer bar 10. The upper rubber bushing 30 is in substantially the same shape as the upper rubber bushing 12 shown in FIG. 1A, and an inner periphery 30a is formed to match the upper outer periphery of the stabilizer bar 10. The upper rubber bushing 30 differs from the upper rubber bushing 12 in that both peripheral end portions 30b are formed substantially horizontally without being tapered. Specifically, the upper rubber bushing 30 is formed to merely expand circumferentially to expand for about 180 degrees between near −90 degrees and near 90 degrees over an inner periphery 30a and the outer periphery.

The lower rubber bushing 32 is also in substantially the same shape as the lower rubber bushing 14 shown in FIG. 1A, and an inner surface 32a is formed to match the outer periphery of the lower outer periphery of the stabilizer bar 10. Again, both circumferential end portions 32b of the lower rubber bushing 32 are not tapered and are formed substantially horizontally.

FIG. 3B shows a state after the upper and lower rubber bushings 30 and 32 are adhered to the stabilizer bar 10. Unlike the state of FIG. 1B, a gap 34 is formed between the upper and lower rubber bushings 30 and 32 in this comparison example. This is because the shape of the upper and lower rubber bushings 30 and 32 is deformed when the inner peripheries 30a and 32a are adhered by pressure to the stabilizer bar 10 with the adhesive applied over the inner peripheries 30a and 32a. Both end portions 30b and 32b are somewhat shrunk from the horizontal plane at the outer peripheries thereof because of the deformation, and a gap 34 is then formed between both end portions 30b and 32b. In the illustrated example, the gap is angled at about 5 degrees. Specifically, both end portions 30b of the upper rubber bushing 30 are shrunk upward by about 2 to 3 degrees at the outer periphery side, while both end portions 32b of the lower rubber bushing 32 are shrunk downward by about 2 to 3 degrees at the outer periphery side. Thus, the maximum gap 34 on the outermost periphery side is, for example, about 1 to 2 mm, although the gap may change depending on the thicknesses of the upper and lower rubber bushings 30 and 32.

Using the upper and lower rubber bushings 30 and 32 of the comparison example may easily cause the intrusion of sand, dirt, water, or the like into the gap 34, leading to the generation of the scratching sound or the stick-slip sound. Further, if degraded by aging, the gap 34 would be expanded to increase the abnormal sound.

In adhering the upper and lower rubber bushings 30 and 32 of the comparison example to the stabilizer bar 10, it would be possible to fix the stabilizer bar 10 by carefully controlling pressing during adhesion to prevent generation of the gap 34. In a case where both end portions 30b and 32b of the upper and lower rubber bushings 30 and 32 are merely in contact with each other, the gap 34 may be generated instantly, although the gap 34 is not constantly present, when the deformation occurs by twisting of the stabilizer bar 10. Further, the gap 34 should appear when the elasticity decreases due to the degradation by aging.

To address such a problem, both end portions 12b and 14b of the upper and lower rubber bushings 12 and 14 shown in FIG. 1A are tapered at an angle larger than the angle of the gap shown in FIG. 3B. This enables pressing and bonding with sufficient strength even when the deformation occurs during adhesion.

In the above description, the adhesive is only applied to the inner peripheries 12a and 14a of the upper and lower rubber bushings 12 and 14, while no adhesive is applied to both end portions 12b and 14b in FIG. 1A. This is because the intrusion of sand, dirt, water, or the like can be decreased, while no inconvenience may occur in supporting the stabilizer bar 10, without adhesion between the both end portions 12b and 14b. Alternatively, however, both end portions 12b and 14b may be bonded with the adhesive.

In the above description, the inner peripheries 12a and 14a of the upper and lower rubber bushings 12 and 14, respectively, are formed in substantially the same shape as the outer periphery of the stabilizer bar 10. Such a matching shape can achieve uniform stress and smooth adhesion. However, a sufficiently stable function can be expected after the adhesion even if the shapes of the inner peripheries 12a and 14a are somewhat different from the shapes of the outer periphery of the stabilizer bar 10 on the condition that the inner peripheries 12a and 14a are in contact with each other and adhered to the entire surface of the stabilizer bar 10 when pressed with the jig.

Further, it is expected in the example of FIG. 1A to apply the pressure force uniformly in the direction of the arrows 16 and 18 to adhere the upper and lower rubber bushings 12 and 14. Alternatively, the distribution, direction, and so on of the force to be applied may be controlled carefully, such as applying the compressing force laterally from both sides, to reduce or prevent the generation of the gap 34 due to the deformation shown in FIG. 3B.

Both end portions 12b and 14b of the upper and lower rubber bushings 12 and 14 may be formed in another shape if they can be sufficiently pressed and bonded with each other after the adhesion. In one example, the lower rubber bushing 32 shown in FIG. 3A (i.e., having both end portions 32b being substantially horizontal) is adopted, and the tapering angle of the both end portions 12b of the upper rubber bushing 12 are almost doubled. If the opposite end portions of the divided bushings are formed as such to overlap each other before the adhesion, both end portions are expectedly pressed and bonded together after the adhesion. Therefore, it is possible to form the left and right end portions of the divided bushings in different shape. The end portions may be formed linearly (planarly) or may be curved. Thus, the opposite tapered portions may be formed corrugated to mesh with each other to strengthen the connection between the end portions.

The two divided bushings can further prevent generation of the gap as the overlapping amount between the bushings increases to press each other more strongly. If the overlapping increases exceedingly, however, a spring constant between the end portions after the adhesion may increase also exceedingly. In such a case, the spring constant needs to be set to a value below a predetermined value, while the pressing level between the divided bushings is set to a value beyond a predetermined value. In the example of FIGS. 1A and 1B, it is assumed that both end portions 12b of the upper rubber bushing 12 and both end portions 14b of the lower rubber bushing 14 are set such that the two sets of opposite surfaces overlap at an angle of about 10 degrees and with a protruding amount at the outer periphery side of about 2 to 6 mm. As shown in FIG. 1A, both end portions 12b and 14b are formed so that, before adhesion, an amount of distance between the divided bushings decreases toward an outer periphery side of the divided bushings. Specifically, the overlapping amount relies on a material of the bushings or the shape of the divided bushings after adhesion. Therefore, the overlapping level may be, for example, about 1, 2, 4, 6, 8, 10, 12, 14, 16, 18, 20, 25, or 30 degrees. The protruding amount on the outer periphery side is about 0.5, 1, 2, 3, 4, 5, 6, 7, 8, 9, 10, 12, 15, or 20 mm.

In the above example, the upper and lower rubber bushings 12 and 14 are divided substantially equally into halves, but the division may be carried out unequally. If the division is carried out extremely unequally, however, it would be difficult to fit the larger bushing to the inner periphery of the stabilizer bar. It would be more reasonable, therefore, to divide the bushing within such a range as to allow smooth fitting to the stabilizer bar.

In the above description, the upper and lower directions have been determined in accordance with the directions shown in the drawings, but the directions may be reversed or set at other angles different from the angle of the drawings in actual installation on the vehicle.

REFERENCE SIGNS LIST

10 Stabilizer bar
12, 30 Upper rubber bushing
12a, 14a, 30a, 32a Inner periphery
12b, 14b, 30b, 32b End portion
14, 32 Lower rubber bushing
16, 18 Arrow
20 Bonding surface
22 Stabilizer bushing
24 Casing
24a Connecting portion
26 Bolt
28 Vehicle body
28a Bolt hole
34 Gap

The invention claimed is:

1. A stabilizer bushing, comprising:
two divided bushings formed of an elastic member and installed on an outer periphery of a stabilizer bar by adhesion, wherein
before the adhesion, end portions of the divided bushings in a circumferential direction are formed in a manner that at least one end portion of each divided bushing protrudes toward the other bushing, closer toward an outer periphery side of the divided bushings.

2. The stabilizer bushing according to claim 1, wherein the divided bushings face each other across the stabilizer bar after the adhesion, and the end portions, which face each other, of the divided bushings in the circumferential direction are bonded by pressure.

3. A stabilizer bushing, comprising:
two divided bushings formed of an elastic member and installed on an outer periphery of a stabilizer bar by adhesion, wherein
before the adhesion, both end portions of the divided bushings in a circumferential direction are tapered to protrude toward each other in a manner that a protruding amount increases toward an outer periphery side of the divided bushings.

* * * * *